(12) United States Patent
Gardner et al.

(10) Patent No.: US 7,363,536 B1
(45) Date of Patent: Apr. 22, 2008

(54) DELIVERY OF AN INTERRUPTION TO AN OPERATING SYSTEM

(75) Inventors: Robert D. Gardner, Fort Collins, CO (US); Daniel J. Magenheimer, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 719 days.

(21) Appl. No.: 10/903,218

(22) Filed: Jul. 30, 2004

(51) Int. Cl.
*G06F 11/00* (2006.01)

(52) U.S. Cl. .................................... 714/15
(58) Field of Classification Search .............. 714/3, 714/15; 712/228, 244
See application file for complete search history.

(56) References Cited

U.S. PATENT DOCUMENTS

| | | | |
|---|---|---|---|
| 5,937,186 A * | 8/1999 | Horiguchi et al. | 712/244 |
| 6,065,114 A * | 5/2000 | Zahir et al. | 712/228 |
| 6,367,005 B1 * | 4/2002 | Zahir et al. | 712/228 |
| 2004/0111572 A1 * | 6/2004 | Arimilli et al. | 711/156 |
| 2004/0123083 A1 * | 6/2004 | Zahir et al. | 712/226 |
| 2006/0242643 A1 * | 10/2006 | Belmar et al. | 718/100 |

OTHER PUBLICATIONS

Hewlett Packard, "Inside the Intel Itanium 2 Processor, an Itanium Processor Family member for balanced performance over a wide range of applications," a Hewlett Packard Technical White Paper, Jul. 2002, 1-43.
Intel, Intel Itanium Architecture Software Developer's Manual Specification Update, Nov. 2003, Document No. 248699-008, 1-30.
Intel, Intel Itanium Architecture Software Developer's Manual, vol. 1: Application Architecture, Revision 2.1, Oct. 2002, Document No. 245317-004, 235 pages (i-xii, cover and 1:1-204, index 1-18).
Intel, Intel Itanium Architecture Software Developer's Manual, vol. 2: System Architecture, Revision 2.1, Oct. 2002, Document No. 245318-004, 537 pages (i-xvi, cover and 2:1-2:502, index 1-18).
Intel, Intel Itanium Architecture Software Developer's Manual, vol. 3: Instruction Set Reference. Revision 2.1, Oct. 2002, Document No. 245319-004, 957 pages (i-x, cover and 3:1-3:928, index 1-18).

* cited by examiner

*Primary Examiner*—Marc Duncan

(57) ABSTRACT

One embodiment of the invention is a method for handling an interruption during execution of an application on a computer system that uses a register stack, the method comprising receiving the interruption by a hypervisor, sending the interruption to an operating system for handling; if the register stack has a fault, then generating, by the operating system, another interruption that is delivered to the hypervisor; after receiving the another interruption, covering, by the hypervisor, the register stack; after covering the register stack, sending the interruption to the operating system for handling; and after handling, returning to execution of the application.

26 Claims, 2 Drawing Sheets

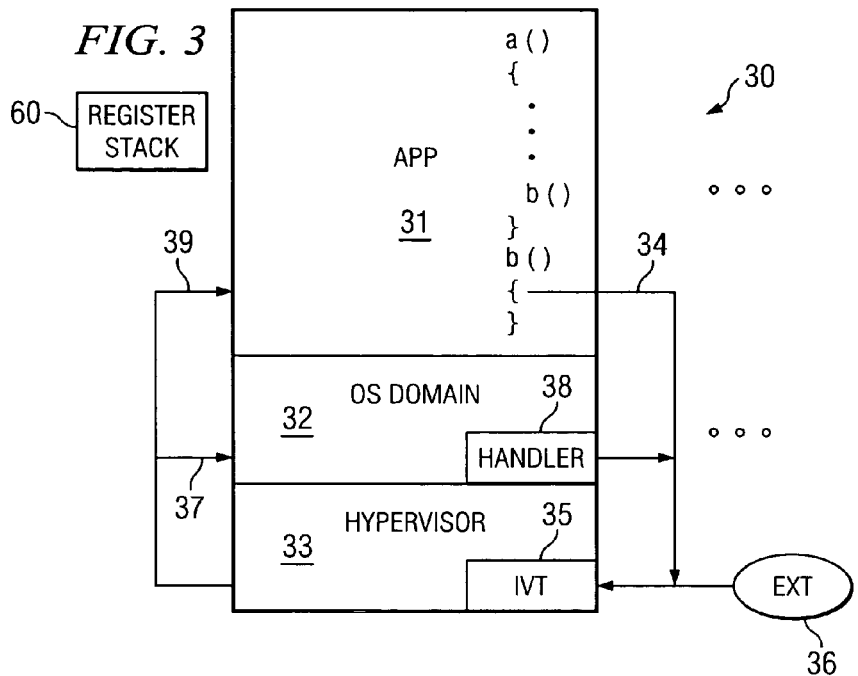
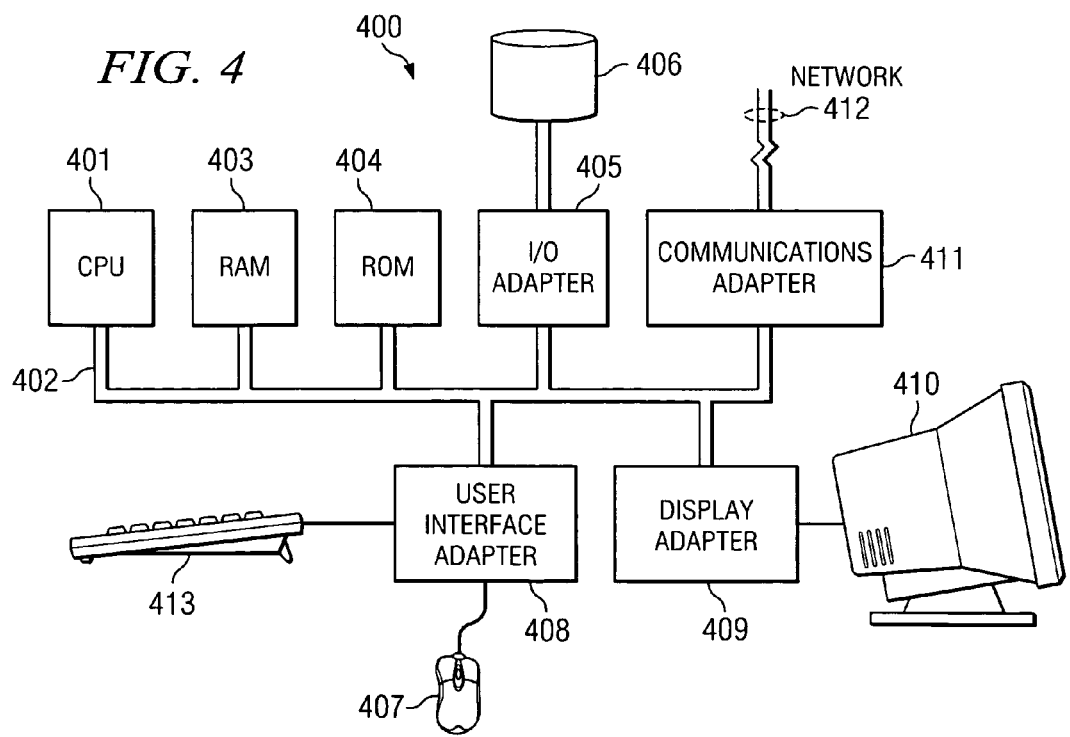

DELIVERY OF AN INTERRUPTION TO AN OPERATING SYSTEM

CROSS-REFERENCE TO RELATED APPLICATIONS

This application is related to and commonly assigned U.S. Patent Application Ser. No. 10/784,065 entitled "FLEXIBLE OPERATING SYSTEM OPERABLE AS EITHER NATIVE OR AS VIRTULAIZED," the disclosure of which is hereby incorporated herein by reference.

FIELD OF THE INVENTION

This application relates in general to a computer system and in specific to a system and method that manages interruption delivery to an operating system.

DESCRIPTION OF THE RELATED ART

In a computer system that includes an Itanium Processor Family (IPF) chip, the processors are controlled by the operating system. IPF chips are produced by Intel.

IPF firmware has three components that separate the operating system (OS) from the processors and the platform. The firmware, in general, isolates the OS and other higher level software from implementation differences in the processors and the platform. The platform includes all of the non-processor hardware. One component is the processor abstraction layer (PAL). This layer includes processor implementation specific features and is part of the Itanium processor architecture. PAL operates independently of the number of processors. Another component is the platform/system abstraction layer (SAL). SAL includes the platform specific features. The last component is the extensible firmware interface (EFI). This layer is the platform binding specification layer that provides a legacy-free application programming interface (API) to the OS. PAL, SAL, and EFI together provide system initialization and boot, machine check abort (MCA) handling, platform management interruption (PMI) handling, and other processor and system functions which would vary between implementations. Additional information on IPF systems may be found in Intel manuals "Intel Itanium Architecture Software Developer's Manual," Vol. 1: Application Architecture, Rev. 2.1, October 2002, Doc. No. 245317-004; "Intel Itanium Architecture Software Developer's Manual," Vol. 2: System Architecture, Rev. 2.1, October 2002, Doc. No. 245318-004; and "Intel Itanium Architecture Software Developer's Manual," Vol. 3: Instruction Set Reference, Rev. 2.1, October 2002, Doc. No. 245319-004, all which are incorporated herein by reference.

BRIEF SUMMARY OF THE INVENTION

One embodiment of the invention is a method for handling an interruption during execution of an application on a computer system that uses a register stack, the method comprising receiving the interruption by a hypervisor; sending the interruption to an operating system for handling; if the register stack has a fault, then generating, by the operating system, another interruption that is delivered to the hypervisor; after receiving the another interruption, covering, by the hypervisor, the register stack; after covering the register stack, sending the interruption to the operating system for handling; and after handling, returning to execution of the application.

BRIEF DESCRIPTION OF THE DRAWINGS

FIG. 3 depicts an example of computer system configured to handle faults according to embodiment of the invention; and FIG. 4 is a block diagram of a computer system which is adapted to use the present invention.

DETAILED DESCRIPTION

Figure 1A:
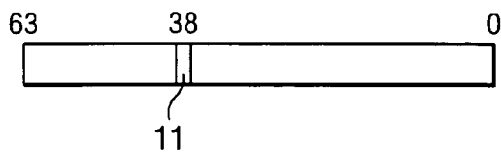
FIGS. 1A and 1B depict registers according to embodiments of the invention.

A typical IPF system may generate one or more interruptions during its operations. For example, an IPF system may use a translation lookaside buffer (TLB) to allow for virtual memory operations. Virtual memory provides the appearance of contiguous pages to a program, but allows the system to allocate physical memory as needed and where present. Thus, the virtual memory may have adjacent locations but the physical memory may have disjoint locations. When a virtual memory location is encountered during execution, the TLB is used to convert the virtual memory location into a physical memory location.

During operations, a TLB miss may occur, wherein the physical memory location for a corresponding virtual memory reference may not be located in the TLB. In this case, the physical memory location needs to be determined by another agent (typically the operating system (OS)), and then this entry is placed into the TLB. This is handled by issuing an interruption to invoke the OS, which will then resolve the TLB miss. During the interruption, the executing context (e.g. the OS or application) will trap to the OS. The OS will then determine the proper physical address for the corresponding virtual address, and then insert that entry into the TLB. The interrupted context then proceeds with execution and re-executes the faulting instruction.

A TLB miss may occur during register stack operations. A typical IPF system may have 128 registers, of which 32 are fixed and 96 are stacked. Each procedure call can allocate up to 96 of the stacked registers while having access to the 32 fixed registers. A register save engine (RSE) is used to handle register overflow and underflow conditions. When a procedure call exceeds the number of available registers, the RSE frees up register space by saving away older register frames into memory. The area of memory used to store the register frames is known as the register stack backing store or RSE backing store. When returning, the RSE will restore the proper register contents to the physical register file.

The RSC backing store uses virtual memory. During a procedure call, one or more registers may have their contents written to memory. During a procedure return, the register contents may be read from memory to be written back into the physical register(s). When either of these two transactions occur, it may be that the page of memory being accessed does not have sufficient information to complete the reference (e.g. a TLB entry may be missing or may restrict permission), in which case a TLB related interruption occurs, e.g. a TLB miss.

Another type of interruption is an external interrupt or asynchronous interrupt. This interruption originates external to the execution of the application. This interruption may be initiated by the OS, a user, a hardware device, or other agent in the system that needs to halt the execution of the application. Again, the OS handles the fault, and then execution is resumed. Note that the two types of interruptions may happen simultaneously. In such a case, both interruptions would be handled by the OS, and the execution would resume. Note that interruptions include interrupts, faults, traps, and aborts.

Figure 1B:
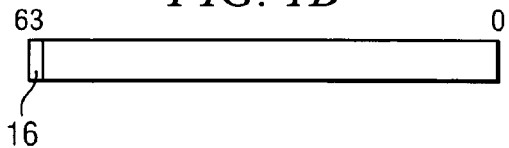

IPF systems use a control register 10 to track the interruption status of the register stack, as shown in FIG. 1A. A bit 11 in the control register (CR.ISR) is used to indicate that there is an interruption associated with the register stack. Note that CR is control register and ISR is interruption status register. The interruption may be any type of interruption, including TLB miss (i.e., fault). IPF systems use a control register 150 to control the operation of the register stack, as shown in FIG. 1B. A bit 16 in the control register (CR.IFS) is used to place the register stack in a quiescent state, which prevents the register stack from being restored to the state at which an interruption occurred. Note that CR is control register and IFS is interruption function state. Note that the specific bit locations in the registers is by way of example only, as other bits may be used. Further note that bit 11 and bit 16 may be located in the same register.

In traditional systems, there are two levels of privilege, essentially the most-privileged level, i.e. the OS, and the least-privileged level, i.e. the application. With this arrangement, interruption handling is routine: the application traps to the OS, the OS handles the interruption, and resumes execution of the application.

In a more complex system, multiple OSs may be used, with each OS having access to the same processors and other system resources as the other OSs. The OSs cannot have the most-privileged level, as this would result in an unstable and unsecure operating environment, since each OS would then have the ability to interfere with the operations of the other OSs. Thus, at least one additional level of privilege is needed for multiple OS systems. More specifically, a most-privileged level comprises the hypervisor or virtual machine monitor, a middle-privileged level comprises the OS, and a least-privileged level comprises the application(s). Note that these OSs may be referred to as guest operating systems, unprivileged operating systems, and/or demoted operating systems. All of these terms relate that the OSs are no longer operating at the most-privileged level. Note that the hypervisor can execute all privileged instructions on the CPU and can access all memory, whereas the OSs cannot execute all privileged instructions on the CPU and can only access their respective assigned memory.

Fault handling in multiple systems also becomes more complex, as different agents with different levels of privilege are needed to handle the fault. For example, for a TLB miss, the OS associated with the faulting application will have the proper physical address reference for the virtual memory location, but the OS lacks the privilege level needed to write the entry into the TLB buffer. The hypervisor has the proper privilege to write the entry into the TLB buffer, but the lacks the knowledge of the proper physical address. Thus, both the hypervisor and the OS are involved in handling the fault. For example, a TLB miss triggers an interruption that is delivered to the hypervisor. The hypervisor, realizing that this is a TLB fault, delivers an exception to the OS associated with the faulting application. The OS determines the proper physical address for the TLB miss, and provides this entry back to the hypervisor. The hypervisor then writes the entry into the TLB, and signals the application to resume execution.

In some systems, there may be an additional level of addressing in the memory hierarchy, which serves the purpose of hiding actual physical addresses from the OS. These type of addresses in this additional level are referred to as metaphysical addresses. Metaphysical addresses are presented to the OS instead of physical addresses to facilitate the substitution of physical pages out from under the OS. The translation of metaphysical addresses to actual physical addresses is handled by the hypervisor as necessary, for instance, when the OS requests a TLB entry insertion. Fault handling, as described in the previous paragraph, is applicable to metaphysical addresses just as for physical addresses, with the only difference being that the hypervisor dose the final physical address determination instead of the OS.

Handling multiple simultaneous faults in a system with multiple OSs can be even more complex. The logic required to process multiple faults can become untenable. The logic needs be able to handle RSE related faults, nested faults, determine whether a domain switch (a switch from one OS to another OS) is underway, whether there are pending faults in the new domain, save the contents of the CR.ISR bit, etc. Even with complex logic, every corner case of every situation may not be addressed, thus raising the possibility of system failure.

Embodiments provided herein handle the RSE faults lazily. The term "lazy" is used because embodiments recognize and response to the fault condition after it occurs, rather than trying to either avoid the fault or predict the fault.

Figure 2:
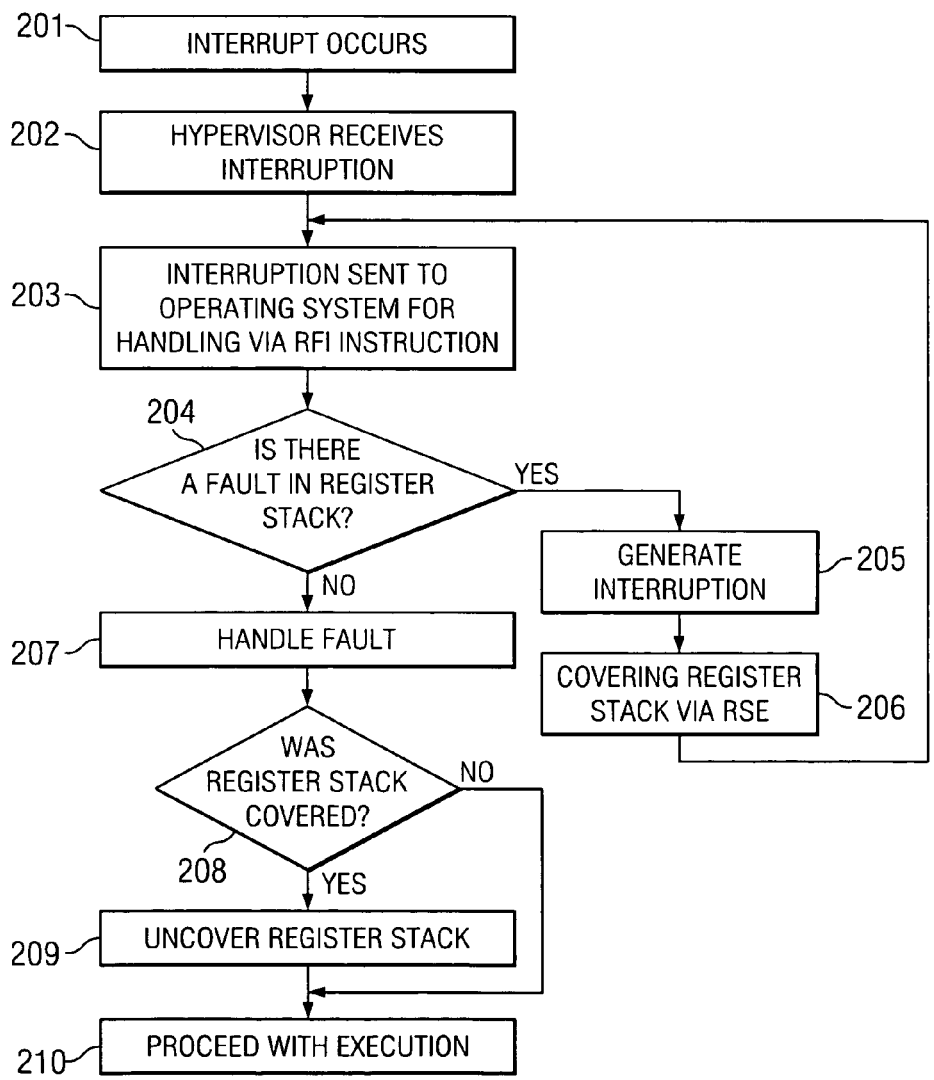
FIG. 2 depicts an example of a method to handle interruptions according to embodiments of the invention.

FIG. 2 depicts an example of a method to handle interruptions according to one embodiment provided herein. FIG. 3 depicts an example of computer system 30 configured to handle faults according to this embodiment.

In block 201 of the operational flow 200, an interruption occurs. The interruption may have originated in the application 31, via executing a line of code 34 (e.g. TLB miss), or it may have originated in the OS, or it may have originated external to the application 36 (e.g. an I/O interrupt). In any event, in block 202, the interruption is received by the interruption handler of the hypervisor 33 known as interruption vector table (VIT) 35. The IVT transfers the interruption to the interruption handler 38 of the OS domain by the use of the RFI instruction 37 in operational block 203. The return-from-interruption (RFI) instruction will cause the register stack 60 to the reset to the state when the fault occurred. If the register stack 60 is involved in the interruption, then the handler 38 will fault immediately because the register stack has a fault, block 204. If the register stack is not involved in the original fault, then the handler 38 will process the interruption, block 207, and signal the application 31 to resume execution, block 210. If the hypervisor 33 needs to act (e.g. to write an entry into the TLB), then the handler 38 will signal the hypervisor 33 to act, and then the hypervisor 33 will signal the application 31 to resume execution, via RFI instruction 39. Note that a register stack 60 with a fault (or caused a fault) may be referred to as an incomplete register frame.

If the register stack 60 is involved in the interruption, then the handler 38 faults and the hardware delivers another interruption to the IVT 35, block 205. The IVT recognizes the reoccurrence of the fault via the CR.ISR bit 11 (FIG. 1A).

The IVT 35 then examines the contents of the CR.ISR bit 11, and if the bit is set, indicating a fault involving the register stack 60, then the IVT 35 prevents the state of the register stack 60 from being restored. The IVT 35 will change a bit 16 in the CR.IFS 15 (FIG. 1B) to place the register stack 60 in a quiescent state, which prevents the register stack 60 from being restored. This is referred to as covering the register stack via RSE, block 206. The interruption is then resent to the handler 38 via the RFI instruction 37, block 203. In this iteration, there will be no fault from the domain handler 38 in block 204, and the domain handler 38 processes the fault, block 207. Upon completion of the fault handling, the hypervisor 33 will uncover the register stack (block 209), if covered (block 208). The hypervisor changes back the bit 16 in the CR.IFS 15, thereby removes the register stack 60 from the quiescent state back to an active state. The application 31 will proceed with execution, block 210.

Note that this method results in an IVT-to-domain interruption delivery, but this situation happens rarely enough that performance is not an issue.

Thus, embodiments are operative for multiple faults occurring simultaneously. For example, assume that an external interruption 36 occurs with a TLB miss that involves the register stack 60. Since the external interruption 36 has a higher priority in the IVT 35, it will be processed first. The fault is delivered to the OS 32 for handling, which upon execution, immediately causes another fault. The IVT 35 then covers the RSE, and resends the interruption to the OS 32. The OS with the register stack covered, can process the external interruption. Upon completion of the fault handling, the hypervisor 33 uncovers the RSE, and the application 31 will proceed with execution. Since there is a pending fault, namely the TLB miss, the application 31 will fault again. The fault is delivered to the OS 32 for handling, which upon execution, immediately causes another fault. The IVT 35 then covers the RSE, and resends the interruption to the OS 32. The OS 32 with the register stack covered, can process the TLB miss. Upon completion of the fault handling, the hypervisor 33 uncovers the RSE, and the application 31 will proceed with execution. Note that the lower level fault is ignored until completion of the higher level fault.

Note that any of the functions described herein may be implemented in hardware, software, and/or firmware, and/or any combination thereof. When implemented in software, the elements of the hypervisor are essentially the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer disk signal may include any signal that can propagate over a transmission medium such as electronic network channels, optical fibers, air, electromagnetic, RF links, etc. The code segments may be downloaded via computer networks such as the Internet, Intranet, etc.

FIG. 4 illustrates computer system 400 adapted to implement the above-depicted embodiments. Central processing unit (CPU) 401 is coupled to system bus 402. The CPU 401 may be any general purpose CPU with a register stack. However, embodiments provided herein are not restricted by the architecture of CPU 401 as long as CPU 401 supports the inventive operations as described herein. Bus 402 is coupled to random access memory (RAM) 403, which may be SRAM, DRAM, or SDRAM. ROM 404 is also coupled to bus 402, which may be PROM, EPROM, or EEPROM. RAM 403 and ROM 404 hold user and system data and programs as is well known in the art.

Bus 402 is also coupled to input/output (I/O) controller card 405, communications adapter card 411, user interface card 408, and display card 409. The I/O adapter card 405 connects to storage devices 406, such as one or more of a hard driver, a CD drive, a floppy disk drive, or a tape drive, to the computer system. The I/O adapter 405 is also connected to printer 414, which would allow the system to print paper copies of information such as document, photographs, articles, etc. Note that the printer may be a printer (e.g. dot matrix, laser, etc.), a fax machine, or a copier machine. Communications card 411 is adapted to couple the computer system 400 to a network 412, which may be one or more of a telephone network, a local (LAN) and/or a wide-area (WAN) network, an Ethernet network, and/or the Internet network. User interface card 408 couples user input devices, such as keyboard 413, pointing device 407, and microphone 416, to the computer system 400. User interface card 408 also provides sound output to a user via speaker(s) 415. The display card 409 is driven by CPU 401 to control the display on display device 410.

What is claimed is:

1. A method for handling an interruption during execution of an application on a computer system that uses a register stack, the method comprising:
   receiving the interruption by a hypervisor;
   sending the interruption to an operating system for handling;
   if the register stack has a fault, then another interruption is delivered to the hypervisor;
   after receiving the another interruption, covering, by the hypervisor, the register stack;
   after covering the register stack, sending the interruption to the operating system for handling; and
   after handling, returning to execution of the application.

2. The method of claim 1, wherein the interruption is an external interrupt.

3. The method of claim 1, wherein the interruption is caused by execution of the application.

4. The method of claim 1, further comprising:
   after receiving the another interruption, and before covering, determining, by the hypervisor, whether the register stack has a fault.

5. The method of claim 4, wherein determining whether the register stack has a fault comprises:
   examining a bit in a control register that maintains interruption status of the register stack.

6. The method of claim 1, wherein covering the register stack comprises:
   changing a bit in a control register to place the register stack in a quiescent state.

7. The method of claim 1, further comprising:
   after covering the register stack, after handling, and before returning to execution, uncovering the register stack by the hypervisor.

8. The method of claim 7, wherein uncovering the register stack comprises:
   changing a bit in a control register to remove the register stack from a quiescent state.

9. The method of claim 1, wherein the hypervisor has a higher privilege level than the operating system.

10. The method of claim 1, wherein the operating system is one of a plurality of operating systems.

11. The method of claim 1, wherein the interruption is associated with the fault in the register stack.

12. The method of claim 1, wherein the interruption is one of two interruptions, one lower level interruption, and one higher level interruption, and the method further comprises:

ignoring the lower level interruption until the higher level interruption has been handled.

13. The method of claim 12, further comprising:
after handling the higher level interruption, repeating the sending the interruption to an operating system for handling for the lower level interruption.

14. A computer system comprising:
a hypervisor having a first privilege level;
at least one operating system (OS) that has a second privilege level that is lower than the first privilege level, wherein the OS is connected to the hypervisor such an interruption that is received by the hypervisor can be forwarded to the OS for handling;
at least one application that has a third privilege level that is lower than the second privilege level; and
a register stack that is used by at least one of the hypervisor, the OS, and the application during operations of the system;
wherein, if the register stack has a fault, then the hypervisor covers the register stack during handling of the interruption.

15. The system of claim 14 further comprising:
a control register that maintains an interruption status of the register stack.

16. The system of claim 14 further comprising:
a control register that controls that state of the register stack.

17. The system of claim 16 wherein changing a bit in the control register will place the register stack in a quiescent state.

18. The system of claim 14 wherein the at least one OS comprises a plurality of OSs and the at least one application comprises a plurality of applications.

19. A computer system that handles an interruption during execution of an application comprising:
means for sending the interruption to an operating system for handling;
means for covering a register stack if the register stack has a fault; and
means for handling the interruption that is operative while the register stack is covered; and
means for uncovering the register stack after operation of the means for handling;
wherein after the register stack is uncovered, the computer system returns to execution of the application.

20. The system of claim 19, further comprising:
means for determining whether the register stack has a fault;
wherein the means for determining uses a control register that maintains interruption status of the register stack.

21. The system of claim 19 wherein the means for covering changes a bit in a control register to place the register stack in a quiescent state.

22. The system of claim 19 wherein the means for uncovering changes a bit in a control register to remove the register stack from a quiescent state.

23. A tangible computer readable medium having instructions for causing a computer to execute a method comprising:
sending an interruption that occurred during execution of an application to an operating system (OS) for handling by the OS;
determining whether a register stack has a fault;
covering a register stack if the register stack has a fault; and
uncovering the register stack after handling of the interruption by the OS.

24. The tangible computer readable medium of claim 23 wherein the register stack is used by at least one of a hypervisor, the OS, and the application.

25. The tangible computer readable medium of claim 23 further comprising accessesing a control register that maintains an interruption status of the register stack.

26. The tangible computer readable medium of claim 23 further comprising accessesing a control register that controls that state of the register stack, and changes a bit in the control register to place the register stack in a quiescent state.

* * * * *

UNITED STATES PATENT AND TRADEMARK OFFICE
CERTIFICATE OF CORRECTION

PATENT NO.         : 7,363,536 B1                                    Page 1 of 1
APPLICATION NO. : 10/903218
DATED              : April 22, 2008
INVENTOR(S)        : Robert D. Gardner et al.

It is certified that error appears in the above-identified patent and that said Letters Patent is hereby corrected as shown below:

In column 3, line 12, after "register" delete "150" and insert -- 15 --, therefor.

In column 3, line 53, after "but" delete "the".

In column 4, line 10, delete "dose" and insert -- does --, therefor.

In column 4, line 37, after "table" delete "(VIT)" and insert -- (IVT) --, therefor.

In column 4, line 41, after "stack 60 to" delete "the" and insert -- be --, therefor.

In column 5, line 51, delete "disk" and insert -- data --, therefor.

In column 6, line 5, delete "driver" and insert -- drive --, therefor.

In column 8, line 18, in Claim 23, after "method" insert -- , --.

Signed and Sealed this

Nineteenth Day of August, 2008

JON W. DUDAS
*Director of the United States Patent and Trademark Office*